US010263999B2

(12) United States Patent
Li et al.

(10) Patent No.: US 10,263,999 B2
(45) Date of Patent: Apr. 16, 2019

(54) SYSTEM FOR SECURELY ACCESSING NETWORK ADDRESS, AND DEVICE AND METHOD THEREIN

(71) Applicant: BEIJING QIHOO TECHNOLOGY COMPANY LIMITED, Beijing (CN)

(72) Inventors: Tao Li, Beijing (CN); Xu Zhang, Beijing (CN); Yi Ding, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 672 days.

(21) Appl. No.: 14/779,810

(22) PCT Filed: Feb. 24, 2014

(86) PCT No.: PCT/CN2014/072469
§ 371 (c)(1),
(2) Date: Sep. 24, 2015

(87) PCT Pub. No.: WO2014/154073
PCT Pub. Date: Oct. 2, 2014

(65) Prior Publication Data
US 2016/0057161 A1 Feb. 25, 2016

(30) Foreign Application Priority Data

Mar. 25, 2013 (CN) .......................... 2013 1 0097607
Mar. 25, 2013 (CN) .......................... 2013 1 0097764
Mar. 25, 2013 (CN) .......................... 2013 1 0097822

(51) Int. Cl.
*H04L 29/06* (2006.01)
*G06F 17/30* (2006.01)
(Continued)

(52) U.S. Cl.
CPC .... *H04L 63/1416* (2013.01); *G06F 17/30879* (2013.01); *H04L 63/0236* (2013.01);
(Continued)

(58) Field of Classification Search
None
See application file for complete search history.

(56) References Cited

U.S. PATENT DOCUMENTS 8,966,582 B1 * 2/2015 Ainslie .................. G06F 21/51
726/2
2005/0038872 A1 * 2/2005 Ono .................. G06K 7/10722
709/218
(Continued)

FOREIGN PATENT DOCUMENTS

CN 1835457 A 9/2006
CN 102013030 A 4/2011
(Continued)

OTHER PUBLICATIONS

International Search Report for corresponding International Application No. PCT/CN2014/072469, dated Jun. 5, 2014.

*Primary Examiner* — Henry Tsang
(74) *Attorney, Agent, or Firm* — Alston & Bird LLP

(57) ABSTRACT

Disclosed are a system for securely accessing a network address, and a device and a method therein. The system for securely accessing a network address comprises a terminal device and a security control server. The security control server stores security attributes of known network addresses. The terminal device comprises: a scanner, used for scanning a two-dimensional code; a decoder, used for decoding the two-dimensional code scanned by the scanner to obtain a network address corresponding to the two-dimensional code; a transmission interface, used for transmitting the network address to a security control server for check, and receiving a security attribute of the network address from the security control server; and a monitor, used for forbidding or allowing the connection of the network address according to the security attribute of the network address.

5 Claims, 7 Drawing Sheets

(51) Int. Cl.
*H04W 12/08* (2009.01)
*H04L 29/12* (2006.01)
*H04W 12/12* (2009.01)
*H04W 84/12* (2009.01)

(52) U.S. Cl.
CPC .......... *H04L 63/20* (2013.01); *H04W 12/08* (2013.01); *H04L 61/00* (2013.01); *H04L 63/0876* (2013.01); *H04W 12/12* (2013.01); *H04W 84/12* (2013.01)

(56) References Cited

U.S. PATENT DOCUMENTS

| | | | | |
|---|---|---|---|---|
| 2005/0160286 | A1* | 7/2005 | Currie | G06F 21/577 726/22 |
| 2006/0101514 | A1* | 5/2006 | Milener | G06F 17/30902 726/22 |
| 2006/0208088 | A1* | 9/2006 | Sekiguchi | G06K 7/1095 235/472.02 |
| 2008/0301309 | A1* | 12/2008 | Parkinson | G06F 21/6272 709/229 |
| 2011/0047613 | A1* | 2/2011 | Walsh | G06F 21/53 726/16 |
| 2011/0085447 | A1* | 4/2011 | Kholaif | H04W 12/04 370/242 |
| 2012/0047461 | A1* | 2/2012 | Colvin | G06F 21/50 715/810 |
| 2012/0054848 | A1* | 3/2012 | Salowey | H04L 63/0823 726/10 |
| 2013/0091580 | A1* | 4/2013 | Maha | G06F 17/30867 726/26 |
| 2015/0195779 | A1* | 7/2015 | Wu | H04W 48/20 370/338 |

FOREIGN PATENT DOCUMENTS

| | | |
|---|---|---|
| CN | 102664987 A | 9/2012 |
| CN | 102883322 A | 1/2013 |
| JP | 2009282875 A | 12/2009 |

* cited by examiner

SYSTEM FOR SECURELY ACCESSING NETWORK ADDRESS, AND DEVICE AND METHOD THEREIN

FIELD OF THE INVENTION

The present invention relates to the field of network security, particularly to a system for securely accessing a network address, and a device and a method therein.

BACKGROUND OF THE INVENTION

The two-dimensional code has been popularized nowadays, it can be seen everywhere such as roadside posters, bus stop advertising, magazine pages. As long as the user captures the two-dimensional code using his mobile phone, a string of network address will be obtained, then the user can access this network address. The merchants usually use this method to guide the users to access their own network address.

However, since the two-dimensional code is designed for machine identification, it is difficult for people to identify the content to which the two-dimensional code corresponds only by naked eyes, which provides an opportunity for the malicious network address. For example, the two-dimensional code of FIG. 1 is a two-dimensional code encoding the network address "http://www.360.cn", the user cannot recognize by naked eyes this two-dimensional code contains connection of which network address. Assume that FIG. 2 is a two-dimensional code encoding a malicious network address "http://www.evil.com". The user cannot differentiate the two two-dimensional codes in FIG. 1 and FIG. 2 at all. If the user relaxes vigilance to capture a two-dimensional code randomly, and accesses it taking for granted that it is the official website of the merchant, it might be attacked by the malicious website.

In addition, the wireless LAN, such as WiFi (wireless fidelity) network has been very popular, various prompts for WiFI network hotspot can be seen everywhere.

When the user logs in a public wireless LAN hotspot in a public occasion such as hotel, coffee house, it may be connected to a fishing and fraudulent wireless LAN hotspot due to cursoriness, other people can easily intercept the network communication of the user, thereby being likely to steal the user's privacy and sensitive data, so as to cause losses to the user.

Moreover, the wireless LAN hotspot in public occasions such as hotel, coffee house is generally provided with a password, when a terminal device is connected to the wireless LAN hotspot of the public occasion, the user has to input the configuration information of the wireless LAN access device manually, for example, for a wireless LAN signal that has been detected by the terminal device, the user has to input the password of the wireless LAN manually, here, the user needs to ask the staff of the public occasion about the configuration information of the wireless LAN access device firstly, then inputs it manually, which is very cumbersome, moreover, manual input results in mistakes easily, and always spends a long time.

SUMMARY OF THE INVENTION

In view of the above problem, the present invention proposes a system for securely accessing a network address and a device and a method therein, for overcoming the problem of being unable to check whether the network address corresponding to a two-dimensional code is secure in the prior art.

According to an aspect of the present invention, a terminal device for use in a system for securely accessing a network address is provided, the system for securely accessing a network address comprising a security control server stored with security attributes of known network addresses, the terminal device comprising: a scanner configured to scan a two-dimensional code; a decoder configured to decode the two-dimensional code scanned by the scanner to obtain a network address corresponding to the two-dimensional code;

An transmission interface configured to transmit the network address to the security control server for check, and receive the security attribute of the network address transmitted by the security control server; a monitor configured to forbid or allow connection of the network address according to the security attribute of the network address.

According to another aspect of the present invention, a system for securely accessing a network address is further provided, comprising: a security control server and a terminal device as stated above, wherein the security control server comprises: a memory configured to store security attributes of known network addresses; a transmission interface configured to receive a network address obtained and transmitted by the terminal device, wherein the terminal device obtains a network address corresponding to a two-dimensional code by scanning and decoding the two-dimensional code; a checker configured to check whether the network address received by the transmission interface is consistent with the information of the known network address stored by the memory, and transmit the security attribute of the network address to the terminal device through the transmission interface.

According to a further aspect of the present invention, a method for securely accessing a network address is further provided, comprising: storing security attributes of known network addresses to a security control server; a terminal device scanning a two-dimensional code; the terminal device decoding the scanned two-dimensional code to obtain a network address corresponding to the two-dimensional code; the mobile terminal transmitting the network address to the security control server for check, and receiving the security attribute of the network address transmitted by the security control server; the mobile terminal forbidding or allowing connection of the network address according to the security attribute of the network address.

According to yet another aspect of the present invention, a control method for securely accessing a network address is further provided, comprising: storing security attributes of known network addresses to a security control server; the security control server receiving a network address obtained and transmitted by the terminal device, wherein the terminal device obtains a network address corresponding to a two-dimensional code by scanning and decoding the two-dimensional code; the security control server checks whether the network address is consistent with the information of the known network address stored in the security control server; the security control server transmits the security attribute of the network address to the terminal device.

The technical solution of the present invention, after scanning and decoding the two-dimensional code containing the network address information, automatically checks and compares the decoded network address with the known network address, determines whether the decoded network address belongs to known network addresses, and forbids or allows connection of the network address according to the security attribute of the network address, meanwhile, a corresponding reminder can also be provided, which solves the problem of how to check whether the network address corresponding to the two-dimensional code is secure, and avoids the possibility of being attacked by the malicious website effectively.

In addition, the technical solution of the present invention stores the configuration information of the secure wireless LAN access device in a checking device, when the terminal device obtains the configuration information of the wireless LAN by scanning the two-dimensional code, the obtained configuration information of the wireless LAN is transmitted to the checking device for check, it is determined whether the obtained configuration information of the wireless LAN is consistent with the configuration information of the secure wireless LAN access device stored in the checking device, if not, it can be determined that the wireless LAN may has security risks and remind the user, when the user sees the reminder, he can give up connection of the wireless LAN, even if this wireless LAN is connected, defence consciousness will also be improved, thereby reducing the possibility of intercepting user's network communication and stealing the user's privacy and sensitive data by lawbreakers, so as to avoid causing losses to the user.

Moreover, in the technical solution of the present invention, the terminal device obtains the configuration information of the wireless LAN access device by scanning the two-dimensional code arranged within the signal range of the wireless LAN, the terminal device of the user can be connected to the wireless LAN quickly, a mistake will not be made generally, which improves the efficiency of connecting the terminal device to the wireless LAN, and overcomes the problem of error prone and time-consuming in the prior art.

The above explanation is only a summary of the technical solution of the present invention, in order to understand the technical measures of the present invention more clearly, so as to carry it out according to the contents of the description, and in order to make the above and other objects, features and advantages of the present invention to be understood more easily, the specific implementing modes of the present invention will be listed particularly in the following.

BRIEF DESCRIPTION OF THE DRAWINGS

By reading the detailed description of the preferred embodiments in the following, various other advantages and benefits will become clear for the ordinary skilled person in the art. The drawings are only used for illustrating the objects of the preferred embodiments, rather than being regarded as limitations to the present invention. Moreover, in the whole drawings, the same reference sign is used for representing the same component. In the drawings.

DETAILED DESCRIPTION OF THE INVENTION

Figure 1:
FIG. 1 is a two-dimensional code encoding the network address "http://www.360.cn"

Next, the exemplary embodiments of this disclosure will be described more specifically with reference to the drawings. Although the exemplary embodiments of this disclosure have been shown in the drawings, it should be understood that this disclosure can be carried out in various forms while should not be limited by the embodiments expounded here. On the contrary, these embodiments are provided for understanding this disclosure more thoroughly and being capable of communicating the scope of this disclosure to the skilled person in the art completely.

Figure 3:
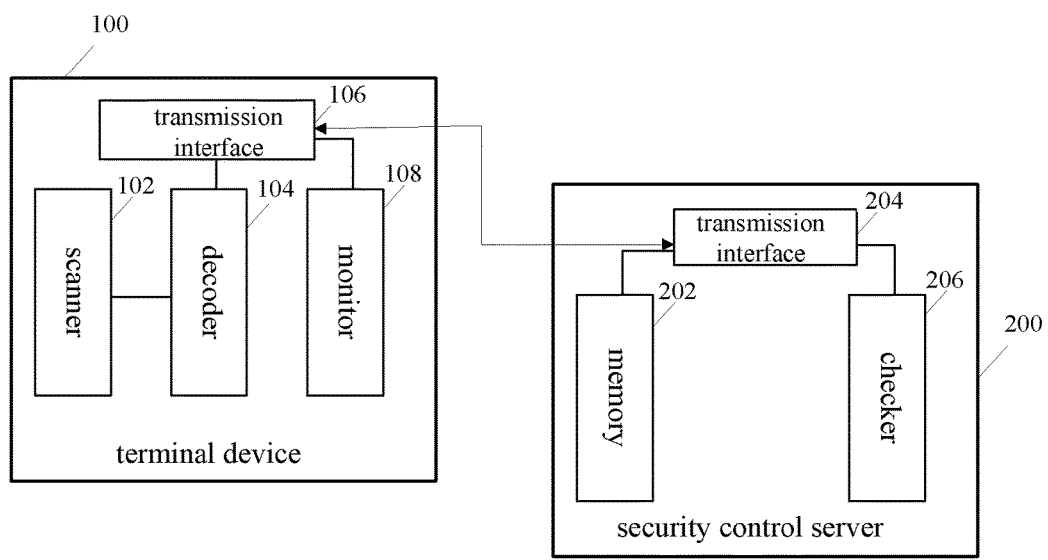
FIG. 3 is a schematic view of a system for securely accessing a network address according to an embodiment of the present invention.

FIG. 3 is a schematic view of a system for securely accessing a network address according to an embodiment of the present invention; as shown in the figure, the system for securely accessing a network address comprises a terminal device 100 and a security control server 200. The terminal device 100 and the security control server 200 may be one or more respectively. FIG. 3 only gives one terminal device 100 and one security control server 200 schematically. The skilled person in the art can understand that there is no limitation to the number of the terminal device 100 and the security control server 200 in the embodiment of the present invention.

Wherein the terminal device 100 may be a mobile terminal such as a smart mobile phone, a panel computer etc. The security control server 200 may be a server in telecommunication with the terminal device 100, and may also be a security module built in the terminal device 100.

Since the respective components in the terminal device 100 and the respective components in the security control server 200 involve information interaction, the respective component comprised in the terminal device 100 and the respective components comprised in the security control server 200 will be introduced generally first in the following, then respective components involved will be introduced more specifically in the specific information interaction process.

The terminal device 100 comprises a scanner 102, a decoder 104, a transmission interface 106 and a monitor 108. The security control server 200 comprises a memory 202, a transmission interface 204 and a checker 206.

The scanner 102 of the terminal device 100 scans the two-dimensional code printed on the poster or displayed on the electronic screen, the two-dimensional code is a code of a network address, generally there are explanations about what network address the two-dimensional code represents beside the two-dimensional code. The scanner 102 sends the scanned two-dimensional code to the decoder 104 for decoding to obtain a corresponding network address. Because the coding and decoding technology of the two-dimensional code has been the international standard, it will not be repeated here.

Wherein, in order to prevent lawbreakers from cheating the user to access the malicious website by using the two-dimensional code, before encoding the network address into a two-dimensional code, the character string of the network address can be encrypted according to certain preset encryption method, the preset encryption method may be a symmetric encryption algorithm and may also be an asymmetric encryption algorithm. When the terminal device 100 decodes the two-dimensional code, it will also decrypt it according to the preset encryption method, thereby being capable of effectively avoiding the lawbreakers from cheating the user to access the malicious website by using the two-dimensional code. In the case that the two-dimensional code is encrypted, the decoder 104 can comprise a decoding module and a decryption module, the decoding module decodes the two-dimensional code received from the scanner 102 to obtain the encrypted character string, then the encrypted character string is sent to the decryption module and decrypted by the decryption module according to the preset encryption method to obtain the corresponding network address.

The decoder 104 sends the decoded network address to the transmission interface 106, the transmission interface 106 transmits the network address to the transmission interface 204 of the security control server 200. The transmission interface 204 transmits the received network address to the checker 206, the checker 206, after receiving this network address, checks from the memory 202 whether the memory 202 stores the security attribute of this network address. Wherein, the memory 202 stores the security attributes of known network addresses, the known network addresses include known secure network addresses and known malicious network addresses. If the memory 202 stores the information of this network address and the network address is a secure network address, the checker 206 will transmit the information that the security attribute of this network address is a secure network address to the transmission interface 106 of the terminal device 100 through the transmission interface 204; if the memory 202 stores the information of this network address and the network address is a malicious network address, the checker 206 will transmit the information that the security attribute of this network address is a malicious network address to the transmission interface 106 of the terminal device 100 through the transmission interface 204; if the memory 202 does not store the information of this network address, the checker 206 will transmit the information that the security attribute of this network address is an unknown network address to the transmission interface 106 of the terminal device 100 through the transmission interface 204.

In addition, the memory 202 can also generate and store a snapshot of a webpage to which the malicious network address points and its threat information, wherein when the snapshot is generated, the titles of the malicious programs such as Trojan, virus planted by the malicious network address and the possible consequences caused thereby can be displayed at a certain position of the webpage to which the malicious network address points. If it is queried in the memory 202 that the network address belongs to a malicious network address, the checker 206 can also transmit the snapshot of the webpage to which this network address points and its threat information to the transmission interface 106 of the terminal device 100 through the transmission interface 204.

The transmission interface 106 transmits the received security attribute of the network address to the monitor 108, after receiving the security attribute of the network address, if the security attribute of the network address is that the network address belongs to a malicious network address, it will be forbidden to open the connection of the network address, thereby avoiding malicious attack, meanwhile, it can also remind the user that the network address has security risks, so that the user learns the security attribute of the network address, in addition, the snapshot of the webpage to which the network address points and its threat information can also be opened, so that the user has more direct understanding of the threat of the network address; if the security attribute of the network address is that the network address belongs to a secure network address, the monitor 108 will allow opening of the connection of the network address, meanwhile, it can also remind the user that the network address is secure, so that the user can learn the security attribute of the network address; if the security attribute of the network address is that the network address is an unknown network address, the monitor 108 can allow or forbid opening of the connection of the network address according to the security level set by the user, for example, if the security level is high, it will be forbidden to open the connection of the network address, otherwise, it will be allowed to open the connection of the network address, meanwhile, the user can also be reminded that the network address may have security risks, when the user sees the reminder, he can choose carefully whether to access this unknown network address or not, even if he accesses the unknown network address, he will also be conscious of the risk so as to avoid losses.

Figure 2:
FIG. 2 is a two-dimensional code encoding the network address "http://www.evil.com"

In addition, for the network address whose security attribute belongs to a malicious network address or an unknown network address, the terminal device 100 can also create a temporary folder in advance, when the webpage to which the network address points is opened, the write disk operation of opening the webpage to which the network address points is redirected to the temporary folder, in this way, a secure virtual execution environment will be constructed. Any write disk operation generated by the terminal device 100 opening the network address will be redirected to the temporary folder, even if the webpage to which the network address points contains malicious programs such as virus, Trojan, after it is installed without permission, it is only installed in this temporary folder, and will not cause damage to the terminal device 100.

wherein, when the monitor 108 reminds the user, it can remind the user by one or more of a label, an air bubble, a pop-up window, a pulldown menu and a speech sound. For example, assume that the scanner 102 of the terminal device 100 currently scans the two-dimensional code as shown in FIG. 2 and sends it to the decoder 104 for decoding to obtain the decoded network address "http://www.evil.com". The decoder 104 sends the network address "http://www.evil.com" to the security control server 200 through the transmission interface 106 for check. The transmission interface 204 of the security control server 200 transmits the received network address "http://www.evil.com" to the checker 206. The checker 206 queries whether the memory 202 stores the information of the network address "http://www.evil.com". Assume that the memory 202 stores the information of the network address "http://www.evil.com" and the network address "http://www.evil.com" is a malicious network address, the checker 206 will transmit the queried information that the security attribute of the network address "http://www.evil.com" is a malicious network address to the transmission interface 106 of the terminal device 100 through the transmission interface 204. Then the transmission interface 106 transmits it to the monitor 108. The monitor 108 forbids opening of the connection of the network address according to the received security attribute, meanwhile, the user can also be reminded by one or more of a label, an air bubble, a pop-up window, a pulldown menu and a speech sound that the network address "http://www.evil.com" is a malicious network address, for example, a label can pop up, on which a reminder that "http://www.evil.com is a malicious network address and it is suggested not accessing it" is displayed, after seeing the reminder, the user may give up the connection of the network address so as to avoid being attacked by the fishing website.

Whereas in the event that the security attribute of the network address received by the monitor 108 is a secure network address, the user can open the webpage to which the network address points safely. Optionally, the terminal device 100 can further comprises a connector, the connector can call the browser in the terminal device 100 to open the webpage when the security attribute of the network address received by the monitor 108 is a secure network address.

Optionally, the security control server 200 can further comprise an encoder, the encoder encodes each secure network address stored in the memory 202 into a two-dimensional code, and provides it to the merchant of the corresponding network address to print it on a planar media such as poster, or sends it to an electronic screen through the transmission interface 204 for display, for the user to scan using the terminal device 100.

In order to prevent the lawbreakers from cheating the user to access the malicious website by using the two-dimensional code, before encoding the network address into a two-dimensional code, the character string of the network address can be encrypted according to certain symmetric encryption method or asymmetric encryption method, the encoder may comprises an encryption module and an encoding module specifically, the encryption module encrypts each secure network address stored in the memory to obtain an encrypted character string, then the encoding module encodes the encrypted character string into a two-dimensional code.

In addition, the security attribute of some websites may also be changed, for example, assume there is a normal website A, the website A is secure normally, however, the lawbreakers have planted Trojan programs in certain period of time using the vulnerabilities of the website, thus the website A will no longer be secure. In order to solve the problem that the security attribute of the website may be changed, the security control server 200 can further comprise a security scanner, the security scanner performs security scanning to the network resources to which the known network address stored in the memory 202 points periodically, and updates the security attribute of the corresponding network address stored in the memory 202 based on the result of the security scanning.

In the above embodiment, after the two-dimensional code containing the network address information is scanned and decoded, the decoded network address will be checked and compared with the known network address automatically, to determine whether the decoded network address belongs to known network addresses, and to forbid or allow the use to open the connection of the network address according to the security attribute of the network address, meanwhile, a corresponding reminder can also be provided, which improves the efficiency of checking whether the network address to which the two-dimensional code corresponds is secure, and effectively avoids the possibility of being attacked by the fishing website.

Figure 4:
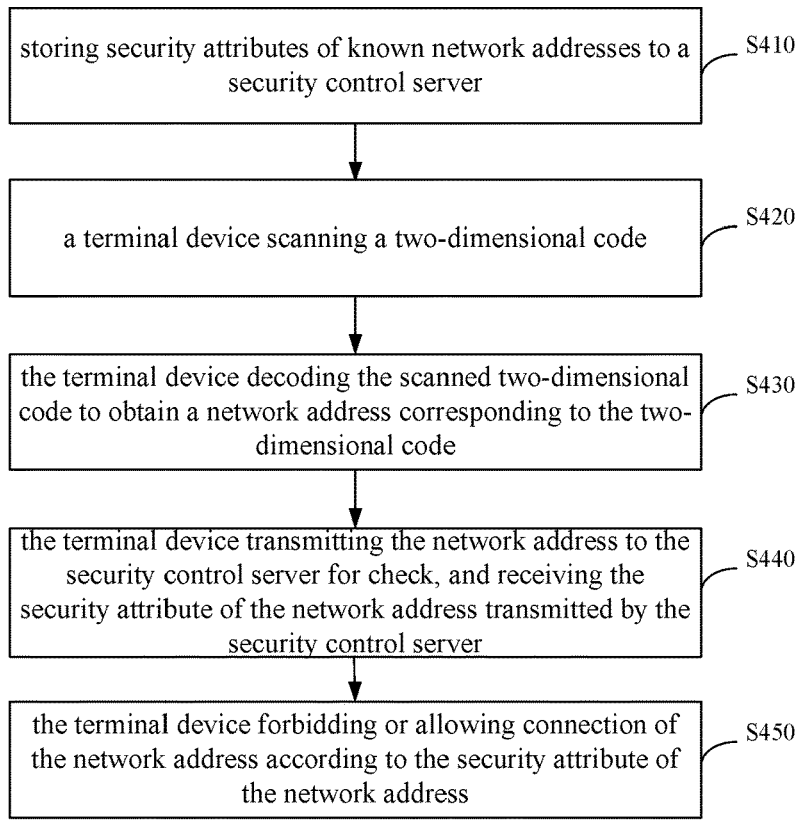
FIG. 4 is a flow chart of a method for securely accessing a network address adapted to be carried out on a terminal device in a system for securely accessing a network address according to an embodiment of the present invention.

Corresponding to the system for securely accessing a network address according to the preceding embodiment of the present invention, FIG. 4 shows a flow chart of a method for securely accessing a network address adapted to be carried out on a terminal device in the system for securely accessing a network address according to an embodiment of the present invention. As shown in the figure, the method comprises:

Step S410: storing security attributes of known network addresses in a security control server;

Step S420: a terminal device scanning a two-dimensional code;

Step S430: the terminal device decoding the scanned two-dimensional code to obtain a network address corresponding to the two-dimensional code;

wherein in the event that the two-dimensional code is encrypted, the step S420 specifically comprises decoding the scanned two-dimensional code firstly to obtain an encrypted character string, then decrypting the encrypted character string to obtain a clear text of the network address.

Step S440: the terminal device sending the network address to the security control server for check, and receiving the security attribute of the network address transmitted by the security control server;

Step S450: the terminal device forbidding or allowing connection of the network address according to the security attribute of the network address.

Wherein, if the security attribute of the network address is that the network address belongs to a malicious network address, it will be forbidden to open the connection of the network address, meanwhile, the user can also be reminded that the network address has security risks; if the security attribute of the network address is that the network address belongs to a secure network address, it will be allowed to open the connection of the network address, meanwhile, the user can also be reminded that the network address is secure, here, the browser on the terminal device can be called to open the webpage to which the network address points; if the security attribute of the network address is that the network address is an unknown network address, it can forbid or allow connection of the network address according to the security level set by the user, meanwhile, the user can also be reminded that the network address may have security risks, after seeing the reminder, the user can choose carefully whether to access the unknown network address or not, even if he accesses the unknown network address, he will also be conscious of the risk so as to avoid losses.

In addition, if the network address belongs to a malicious network address or an unknown network address, the webpage to which the network address points can also be opened, and the write disk operation of opening the webpage to which the network address points can be redirected to a designated folder.

Wherein, when the user is reminded, the reminder can be provided by one or more of a label, an air bubble, a pop-up window, a pulldown menu and a speech sound.

Figure 5:
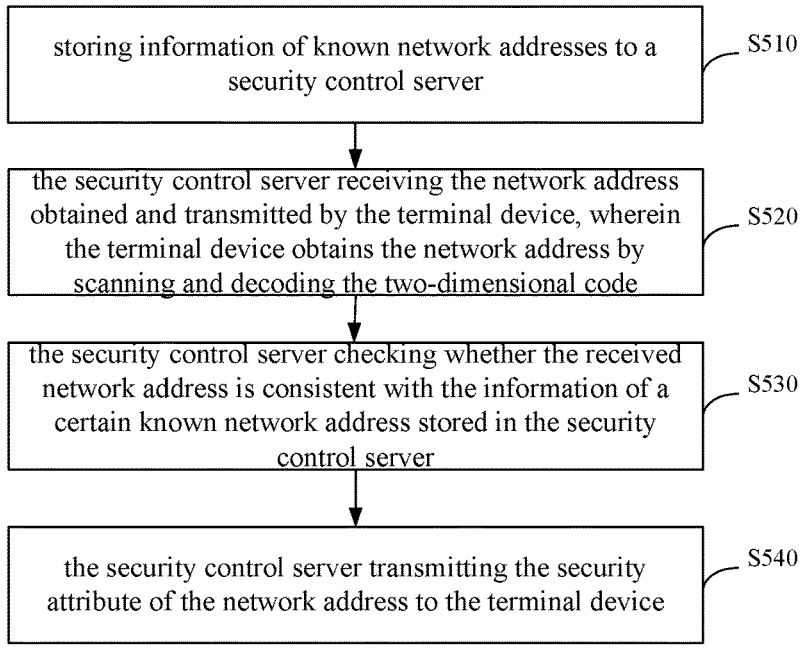
FIG. 5 is a flow chart of a control method for securely accessing a network address adapted to be carried out on a security control server in a system for securely accessing a network address according to an embodiment of the present invention.

Corresponding to the system for securely accessing a network address according to the preceding embodiment of the present invention, FIG. 5 shows a flow chart of a control method for securely accessing a network address adapted to be carried out on a security control server in the system for securely accessing a network address according to an embodiment of the present invention. As shown in the figure, the control method comprises:

Step S510: storing security attributes of known network addresses in a security control server;

Step S520: the security control server receiving the network address obtained and transmitted by the terminal device, wherein the terminal device obtains the network address by scanning and decoding the two-dimensional code;

Step S530: the security control server checking whether the received network address is consistent with the information of the known network address stored in the security control server;

Step S540: the security control server transmitting the security attribute of the network address to the terminal device.

In the above embodiment, after receiving the network address which is obtained by decoding the two-dimensional code and transmitted by the terminal device, the network is checked and compared with the known network address, to determine whether the decoded network address belongs to the known network address, and transmit the security attribute of the network address to the terminal device, so that the terminal device can provide a corresponding reminder for the user, thereby improving the efficiency of checking whether the network address to which the two-dimensional code corresponds is secure, and then the user can choose whether to open the webpage to which the network address points based on the reminder, thereby effectively avoiding from being attacked by the fishing website.

Optionally, the above method may further comprise: encoding each secure network address stored in the security control server into a two-dimensional code.

Optionally, encoding each secure network address stored in the security control server into a two-dimensional code specifically may comprise: encrypting each secure network address stored in the security control server firstly, to obtain an encrypted character string, then, encoding the encrypted character string into a two-dimensional code.

Optionally, the security control server may also perform security scanning to the network resources to which the known network address stored points periodically, and update the security attribute of the corresponding network address stored based on the result of the security scanning.

It should be pointed out that for the above method embodiment, since it is substantially similar as the embodiment of the system for securely accessing a network address, it is described relatively simply, the explanations in the embodiment of the system for securely accessing a network address can be referred for the related parts.

Figure 6:
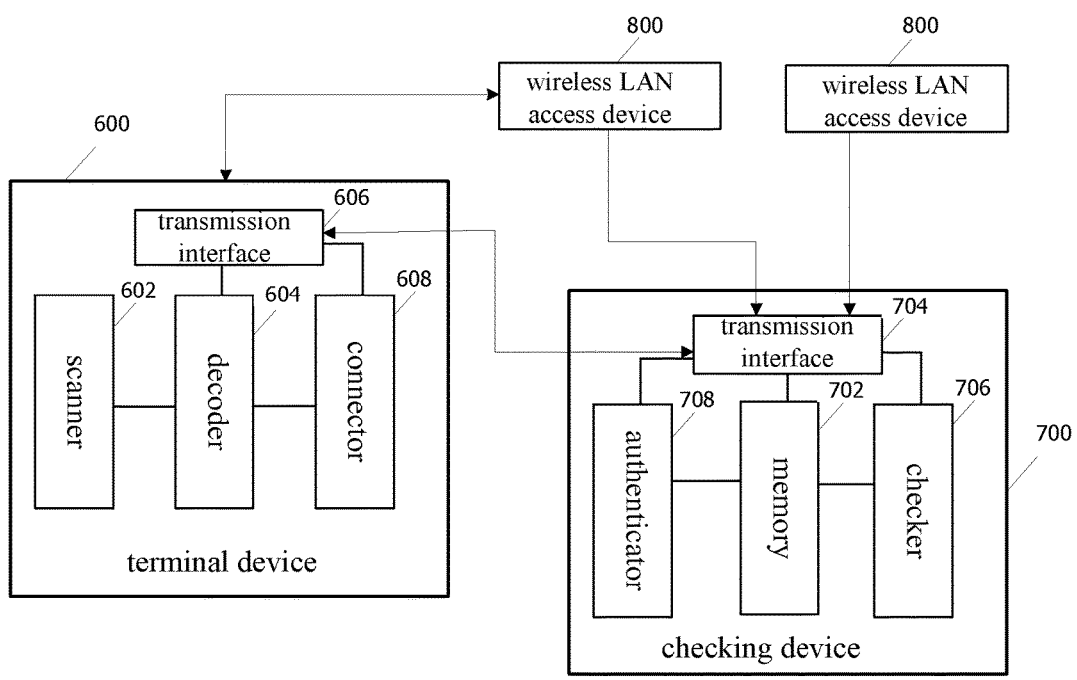
FIG. 6 is a schematic view of a wireless LAN access system according to an embodiment of the present invention.

FIG. 6 is a schematic view of a wireless LAN access system according to an embodiment of the present invention. As shown in the figure, the wireless LAN access system comprises a terminal device 600, a checking device 700 and a wireless LAN access device 800. The terminal device 600, the checking device 700 and the wireless LAN access device 800 may be one or more respectively. FIG. 6 only schematically gives one terminal device 600, one checking device 700 and two wireless LAN access devices 800. The skilled person in the art can understand that the embodiment of the present invention does not limit the number of the terminal device 600, the checking device 700 and the wireless LAN access device 800.

Wherein, the terminal device 600 may be a mobile terminal device such as a smart mobile phone, a panel computer. The checking device 700 may be a server in telecommunication with the terminal device 600. The wireless LAN access device 800 may be a network access device such as a wireless router. The wireless LAN access device 800 sends its configuration information to the checking device 700 after being powered on. In addition, The wireless LAN access device 800 can also send the identity authentication information of its wireless network provider to the checking device 700, wherein the identity authentication information may be digital signature of the wireless network provider, since the digital signature is a segment of numerical string that can only be generated by the information sender and cannot be counterfeited by others, this segment of numerical string is also a valid certification to the authenticity of the information sent by the information sender, hence, it can serve as a valid identity authentication mode.

Since the respective components in the terminal device 600 and the respective components in the checking device 700 involve information interaction, the respective components comprised in the terminal device 600 and the respective components comprised in the checking device 700 will be introduced firstly in the following, then the respective components involved will be introduced more specifically in the specific information interaction process.

The terminal device 600 comprises a scanner 602, a decoder 604, a transmission interface 606 and a connector 608. The checking device 700 comprises a memory 702, a transmission interface 704 and a checker 706. In addition, in order to authenticate the identity of the wireless network provider, the checking device 700 may further comprise an authenticator 208. Next, take the embodiment containing the authenticator 208 as an example for explanation.

The wireless LAN access device 800 transmits its configuration information and the identity authentication information of the wireless network provider to the transmission interface 704 of the checking device 700, then, the transmission interface 704 transmits it to the authenticator 208 to authenticate the identity authentication information, such as the digital signature, of the wireless network provider. If the identity authentication information of the wireless network provider is authenticated successfully, the transmission interface 704 will transmit the configuration information of the wireless LAN access device 800 to the memory 702 for storing. Wherein, in the embodiment that the checking device 700 does not comprise the authenticator 208, the memory 702 can directly store the configuration information of the wireless LAN access device 800 received by the transmission interface 704.

Wherein, the configuration information of the wireless LAN access device at least includes a title of the wireless LAN, in addition, the configuration information of the wireless LAN may further comprises one or more of password or password and encryption type, network type, security type of the wireless LAN. Here, the network type refers to point-to-point network (e.g., PC to PC network) or access point (AP) network, for example, the WiFi network belongs to an access point network; the security type includes open-type, WEP, WAP-individual, WPA-enterprise, WPA2-individual, WPA2-enterprise etc.; the encryption type includes TRIP, AES etc.

The checking device 700 may further comprise an encoder for encoding the configuration information of each successfully authenticated wireless LAN access device stored in the memory 702 into a two-dimensional code, and then transmitting it through the transmission interface 704 to a corresponding electronic screen in an occasion that provides the wireless LAN service for display, or printing it on a planar media such as a poster, and placing or posting it within the signal range of the wireless LAN access device in the occasion that provides the wireless LAN service, generally the explanation on the usage and using method of the two-dimensional code can be printed or displayed beside the two-dimensional code for the user to scan.

Next, take the configuration information of the successfully authenticated WiFi network as an example to explain the encoding of the two-dimensional code. Assume that the configuration information of a public WiFi network provided by a certain successfully authenticated wireless network provider stored in the memory 702 is:

SSID: SD1234;
Network type: access point network;
Security type: WPA2-individual;
Encryption type: TRIP;
Password: 88888888;

The encoder firstly converts the configuration information of the WiFi network into the following character string: SSID=SD1234&Type=AP&Sec=WPA2-PSK&Cr=TRIP&PWD=88888888, then, encodes the character string into a two-dimensional code. The above character string is only an example, it can also be represented by a character string in other formats in specific implementation, as long as the configuration information of the wireless LAN can be provided completely.

Figure 7:
FIG. 7 is a schematic view of a two-dimensional code of configuration information of a wireless LAN according to an embodiment of the present invention.

In addition, for the convenience of identifying whether the character string contained in the two-dimensional code is the configuration information of the wireless LAN to which the mobile terminal connected, before encoding the two-dimensional code, a prefix identifier can be provided in the configuration information for identifying the configuration information of the wireless LAN access device, the prefix identifier can be set by the user flexibly, for example, "http://shouji.360.cn/QR/connect/WiFi/" can be taken as the prefix identifier for identifying the configuration information of the wireless LAN access device, if the character string obtained by decoding the two-dimensional code contains "http://shouji.360.cn/QR/connect/WiFi/", it can be determined that the character string is the configuration information of the wireless LAN. FIG. 7 is a schematic view of a two-dimensional code of configuration information of a wireless LAN of an embodiment of the present invention; the configuration information of the wireless LAN to which the two-dimensional code corresponds is "http://shouji.360.cn/QR/connect/WiFi/ SSID=SD1234&Type=AP&Sec=WPA2-PSK&Cr=TRIP&P WD=88888888".

Wherein, in order to prevent the lawbreakers from intercepting the user's communication data by cheating the user to connect their wireless LAN using the two-dimensional code, before encoding the configuration information of the wireless LAN access device into a two-dimensional code, the character string of the configuration information of the wireless LAN access device can also be encrypted according to a certain preset encryption method. In such a case, the encoder may comprise an encryption module and an encoding module, the encryption module firstly encrypts the configuration information of the each successfully authenticated wireless LAN access device stored in the memory 702, for example, symmetric encryption algorithms such as AES (Advanced Encryption Standard), DES (Data Encryption Standard) can be used to obtain the encrypted character string, then the encoding module encodes the encrypted character string into a two-dimensional code.

In addition, the merchant that provides the public wireless LAN service may also use a certain tool for generating a two-dimensional code, such as a client software installed on the terminal device, or through webpage services, to encode the configuration information of the wireless LAN access device provided by it into a two-dimensional code.

The scanner 602 of the terminal device 600 is used for scanning the two-dimensional code printed on a planar media such as a poster or displayed on an electronic screen, wherein the scanner 602 may be a camera of the mobile terminal such as a mobile phone or a panel computer, the two-dimensional code can be scanned into the terminal device 600 by capturing the two-dimensional code by the scanner 602. The two-dimensional code scanned by the scanner 602 is sent to the decoder 604, the decoder 604 decodes the two-dimensional code into the configuration information of the wireless LAN.

Wherein, in the case that the two-dimensional code is encrypted, the decoder 604 may comprise a decoding module and a decryption module, the decoding module decodes the scanned two-dimensional code to obtain an encrypted character string, then the decryption module decrypts the encrypted character string to obtain the configuration information of the wireless LAN. Wherein, in the case of performing encryption using a symmetric encryption algorithm, the decryption key of the decryption module in the terminal device 600 is same as the encryption key of the encryption module in the checking device 700.

The decoder 604 transmits the decoded configuration information of the wireless LAN to the transmission interface 704 of the checking device 700 through the transmission interface 606. For example, the transmission interface 606 can transmit the configuration information of the wireless LAN to the transmission interface 704 of the checking device 700 through a mobile telephone communication network (such as 3G/2G).

The transmission interface 704 transmits the received configuration information of the wireless LAN to the checker 706 for check. The checker 706 queries whether the memory 702 stores the configuration information of the wireless LAN, if the memory 702 stores the configuration information of the wireless LAN, the check succeeds, if the memory 702 does not store the configuration information of the wireless LAN, the check fails, then the transmission interface 704 transmits the checking result to the transmission interface 606 of the terminal device 600.

If the check result received by the transmission interface 606 is that the check succeeds, namely, the identity of the wireless network provider of the wireless LAN has been authenticated, and the wireless LAN can be used securely, the decoder 604 can transmit the decoded configuration information of the wireless LAN to the connector 608, the connector 608 connects the terminal device 600 to the corresponding wireless LAN according to the configuration information of the wireless LAN, wherein the connector 608 can call the API interface or the human-computer interaction interface of the operating system on the terminal device to set the configuration information of the wireless LAN into the terminal device 600, for example, with respect to the WiFi network, it can be configured according to the WiFi Protected Setup (WPS) specification disclosed by the WiFi union, which will not be repeated here.

If the check result received by the transmission interface 606 is that the check fails, namely, the identity of the wireless network provider of the wireless LAN has not been authenticated, the communication data may be intercepted possibly using the wireless LAN, the user needs to be reminded, in such a case, the terminal device 600 may further comprise a monitor to remind the user that the wireless LAN may has security risks, for example, the user can be reminded by one or more of a label, an air bubble, a pop-up window, a pulldown menu and a speech sound.

In addition, when the terminal device transmits the decoded configuration information of the wireless LAN to the checking device 700 for check, if the mobile telephone communication network of the terminal device 600 is unavailable or the terminal device 600 does not have a mobile telephone communication network, the connector 608 can connect the terminal device 600 to the wireless LAN according to the configuration information of the wireless LAN firstly, in this way, the transmission interface 606 can transmit the configuration information of the wireless LAN to the transmission interface 704 of the checking device 700 in the form of encrypted data (such as using HTTPS protocol) through the wireless LAN. It needs to be pointed out that if the check result received by the transmission interface 606 is that the check fails, the connection of the terminal device 600 to the wireless LAN will be cut off automatically, and the user will be reminded through the monitor.

Optionally, the terminal device 600 can also transmit the configuration information of the wireless LAN that has been used by it and the position information of the wireless LAN to the transmission interface 704 of the checking device 700 through the transmission interface 606, then the transmission interface 704 transmits it to the memory 702 for storing, the configuration information of the wireless LAN can be obtained by user query or according to literal prompt, and can also be obtained by scanning the two-dimensional code with authenticated identity of the wireless network provider; and the position information of the wireless LAN can be obtained through position sensitive means on the terminal device 600 for example through GPS data, signal triangulation, or other known mechanisms. In this way, when other terminal devices 600 connected with the mobile telephone communication network pass through the position where the wireless LAN locates, the position obtainer of the checking device 700 can obtain its position information through the position sensitive means on the terminal device 600 for example through GPS data, signal triangulation, or other known mechanisms, the position obtainer then queries whether the memory 702 stores the configuration information of the wireless LAN that matches with the position information, if it is inquired that the memory 702 stores configuration information of the wireless LAN that matches with the position information, the configuration information of the wireless LAN will be transmitted to the transmission interface 606 of the terminal device 600 through the transmission interface 704, the transmission interface 606 then transmits the received configuration information of the wireless LAN to the connector 608, the connector 608 connects the terminal device 600 to the wireless LAN according to the configuration information of the wireless LAN. Wherein, before the connector 608 connects the terminal device 600 to the wireless LAN, the user can also be reminded by the monitor that there is a wireless LAN available and asked whether to connect the wireless LAN, if the user selects to connect, the connector 608 will connect the terminal device 600 to the wireless LAN according to the configuration information of the wireless LAN, otherwise, the connector 608 abandons connection to the wireless LAN.

Figure 8:
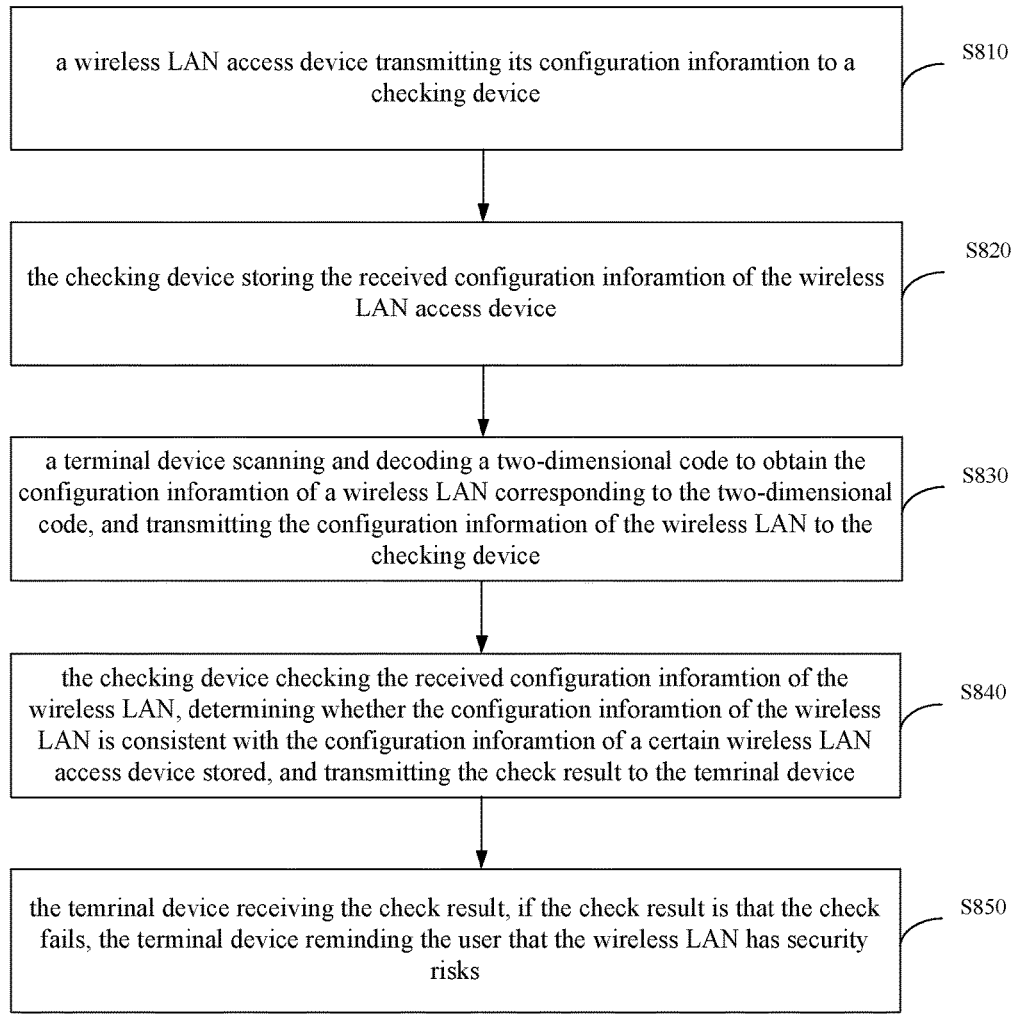
FIG. 8 is a flow chart of a wireless LAN access method according to an embodiment of the present invention.

Corresponding to the wireless LAN access system of the preceding embodiment of the present invention, FIG. 8 shows a flow chart of a wireless LAN access method according to an embodiment of the present invention. As shown in the figure, the access method comprises:

Step S810: a wireless LAN access device transmitting its configuration information to a checking device;

Step S820: the checking device stores the received configuration information of the wireless LAN access device;

Step S830: a terminal device scanning and decoding a two-dimensional code to obtain the configuration information of the wireless LAN corresponding to the two-dimensional code, and transmitting the configuration information of the wireless LAN to the checking device;

Step S840: the checking device checking the received configuration information of the wireless LAN, determining whether the configuration information of the wireless LAN is consistent with the configuration information of the wireless LAN access device stored, and transmitting the check result to the terminal device;

Step S850: the terminal device receiving the check result, if the check result is that the check fails, forbidding connection of the wireless LAN.

Optionally, the above method further comprises: if the check result is that the check succeeds, connecting the terminal device to the wireless LAN according to the configuration information of the wireless LAN.

Optionally, if the check result is that the check fails, the terminal device reminds the user that the wireless LAN has security risks.

Optionally, the above method further comprises: the checking device encoding the configuration information of the wireless LAN access device stored into a two-dimensional code. Optionally, the checking device encoding the configuration information of the wireless LAN access device stored into a two-dimensional code comprises: the checking device encrypting the configuration information of the wireless LAN access device stored to obtain an encrypted character string; the checking device encoding the encrypted character string into a two-dimensional code.

Optionally, the terminal device scanning and decoding the two-dimensional code to obtain the configuration information of the wireless LAN corresponding to the two-dimensional code comprises: the terminal device scanning and decoding the two-dimensional code to obtain an encrypted character string; the terminal device decrypting the encrypted character string to obtain the configuration information of the wireless LAN corresponding to the two-dimensional code.

Optionally, transmitting the configuration information of the wireless LAN to the checking device comprises: the terminal device transmitting the configuration information of the wireless LAN to the checking device through a mobile telephone communication network; or the terminal device being connected to the wireless LAN according to the configuration information of the wireless LAN, transmitting the configuration information of the wireless LAN to the checking device in the form of encryption through the wireless LAN.

Optionally, the above method further comprises: the terminal device transmitting the configuration information and the position information of the wireless LAN that has been used by it to the checking device; the checking device storing the received configuration information and position information of the wireless LAN that has been used by the terminal device.

Optionally, the above method further comprises: the checking device obtaining the position information of the terminal device connected to the internet through the mobile telephone communication network; the checking device inquiring whether it stores the configuration information of the wireless LAN corresponding to the obtained position information; if the checking device inquires the configuration information of the wireless LAN corresponding to the obtained position information, the checking device transmitting the configuration information of the wireless LAN to the corresponding terminal device.

Optionally, wherein the wireless LAN access device further transmits the identity authentication information of its wireless network provider to the checking device; the checking device storing the received configuration information of the wireless LAN access device specifically comprises: the checking device authenticating the received identity authentication information of the wireless network provider of the wireless LAN access device; the checking device storing the configuration information of the wireless LAN access device whose wireless network provider identity authentication information has been authenticated successfully.

It needs to be pointed out that for the method embodiment of the present invention, since it is substantially similar as the preceding embodiment of the wireless LAN access system of the present invention, it is described relatively simply, the explanations in the embodiment of the wireless LAN access system can be referred for the related parts.

Figure 9:
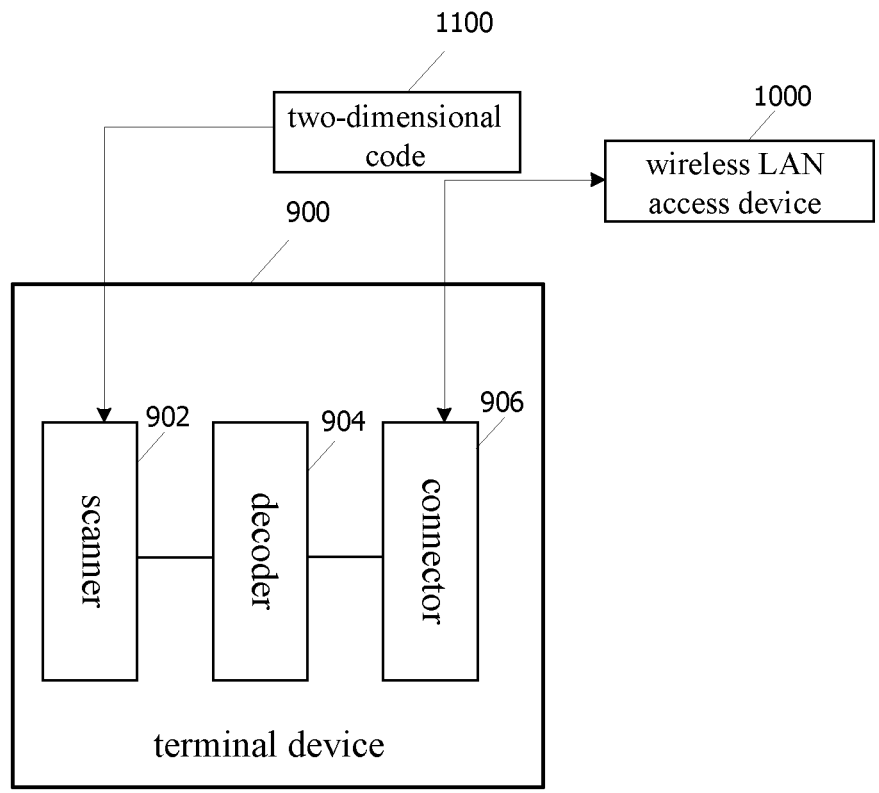
FIG. 9 is a schematic view of a wireless LAN access system according to another embodiment of the present invention

Please refer to FIG. 9, which is a schematic view of a wireless LAN access system of an embodiment of the present invention; as shown in the figure, the wireless LAN access system comprises a terminal device 900, a wireless LAN access device 1000 and a two-dimensional code 1100.

The two-dimensional code 1100 is a code of the configuration information of the wireless LAN access device 1000, the two-dimensional code 1100 is arranged within the signal range of the wireless LAN access device 1000.

The terminal device 900 may be a mobile terminal such as a mobile phone or a panel computer, the terminal device 900 is used for scanning and decoding the two-dimensional code 1100 to obtain a character string containing a prefix identifier for identifying the configuration information of the wireless LAN access device 1000 and the configuration information of the wireless LAN access device 1000, the terminal device 900 accesses the wireless LAN access device 1000 according to the configuration information of the wireless LAN access device 1000 after detecting the prefix identifier.

Optionally, the terminal device 900 may comprise a scanner 902, a decoder 904 and a connector 906.

The scanner 902 is used for scanning the two-dimensional code 1100, wherein the scanner 902 may be a camera of a terminal device such a mobile phone or a panel computer, the two-dimensional code 1100 can be scanned into the terminal device 900 by capturing the two-dimensional code 1100 through the camera. The two-dimensional code 1100 is a code of the configuration information of the wireless LAN access device 1000, which is printed on a planar media such as a poster or displayed on an electronic screen, and posted or placed within the signal range of the wireless LAN access device 1000 in occasions such as coffee house or airport, generally the explanation on the usage and using method of the two-dimensional code can be printed or displayed beside the two-dimensional code 1100 for the user to scan.

Wherein, the configuration information of the wireless LAN access device 1000 at least includes the title of the wireless LAN, in addition, the configuration information of the wireless LAN access device may further comprise one or more of password or password and encryption type, network type, security type of the wireless LAN. Here, the network type refer to a point to point network (e.g., PC to PC network) or an access point (AP) network, for example, the WiFi network belongs to an access point network; the security type includes open-type, WEP, WPA-individual, WPA-enterprise, WPA2-individual, WPA2-enterprise etc.; the encryption type includes TRIP, AES etc.

The merchant that provides the public wireless LAN service may use a certain tool for generating a two-dimensional code, such as a client software installed on the terminal device, or through webpage services, to generate the configuration information of the wireless LAN access device provided by it into a two-dimensional code. Next take the configuration information of a certain WiFi network as an example for explanation. Assume that the configuration information of the public WiFi network provided by a certain merchant is:

SSID: SD1234;
Network type: access point network;
Security type: WPA2-individual;
Encryption type: TRIP;
Password: 88888888;

Using a client software to convert the configuration information of the WiFi network into the following character string: SSID=SD1234&Type=AP&Sec=WPA2-PSK&Cr=TRIP&PWD=88888888, then using the client software to encode the character string into a two-dimensional code. The above character string is only an example, it can also be represented by a character string in other formats in specific implementation, as long as the configuration information of the wireless LAN access device can be provided completely.

Figure 10:
FIG. 10 is a schematic view of a two-dimensional code of configuration information of a wireless LAN access device according to an embodiment of the present invention.

In addition, for the convenience of identifying whether the character string contained by the two-dimensional code 1100 is the configuration information of the wireless LAN access device 1000 to which the terminal device 900 connected, before encoding the two-dimensional code, a characteristic character can also be provided in the configuration information for identifying the configuration information of the wireless LAN access device, the characteristic character can be set by the user flexibly, for example, "http://shouji.360.cn/QR/connect/WiFi/" can be taken as the characteristic character for identifying the configuration information of the wireless LAN access device, if the character string obtained by scanning and decoding the two-dimensional code by the user terminal contains "http://shouji.360.cn/QR/connect/WiFi/", it can be determined that the character string is the configuration information of the wireless LAN access device. FIG. 10 is a schematic view of a two-dimensional code of the configuration information of a wireless LAN access device of an embodiment of the present invention; the configuration information of the wireless LAN access device corresponding to the two-dimensional code is "http://shouji.360.cn/QR/connect/WiFi/SSID=SD1234&Type=AP&Sec=WPA2-PSK&Cr=TRIP&P WD=88888888".

The two-dimensional code scanned by the scanner 902 is transmitted to the decoder 904, the decoder 904 decodes the two-dimensional code into the configuration information of the wireless LAN access device. Wherein, in order to prevent the lawbreakers from intercepting the user's communication data by cheating the user to connect their wireless LAN using the two-dimensional code, before encoding the configuration information of the wireless LAN access device into a two-dimensional code, the character string of the configuration information of the wireless LAN access device can also be encrypted according to a certain preset encryption method, for example, the preset encryption method may use symmetric encryption algorithms such as AES (Advanced Encryption Standard), DES (Data Encryption Standard). When the decoder 904 decodes the two-dimensional code, it will also decrypt it according to the present encryption method, thereby being capable of effectively avoiding the malicious user from intercepting the user's communication data by cheating the user to access its wireless LAN using the two-dimensional code. In the case that the two-dimensional code is encrypted, the decoder 904 may comprise a decoding module and a decryption module, the decoding module decodes the scanned two-dimensional code to obtain an encrypted character string, then the decryption module decrypts the encrypted character string to obtain a clear text of the configuration information of the wireless LAN access device.

The decoder 904 transmits the decoded configuration information of the wireless LAN access device to the connector 906, the connector 906 connects the terminal device to the corresponding wireless LAN according to the configuration information of the wireless LAN access device, wherein, the connector 906 can call the API interface or the human-computer interaction interface of the operating system on the terminal device to set the configuration information of the wireless LAN into the terminal device, for example, with respect to the WiFi network, it can be configured according to the WiFi Protected Setup (WPS) specification disclosed by the WiFi union, which will not be repeated here.

In the above embodiment, the terminal device obtain the configuration information of the wireless LAN access device by scanning the two-dimensional code arranged within the signal range of the wireless LAN, thus the user's terminal device can be connected to the wireless LAN quickly, which improves the efficiency of connecting of the terminal device to the wireless LAN, and overcomes the problem of error prone and time-consuming in the prior art.

Optionally, the above terminal device may further comprise a reminder for detecting whether the configuration information of the wireless LAN access device decoded by the decoder 904 contains a password item, if there is no password item, it can remind the user that the wireless LAN has security risks, for example, the user can be reminded by one or more of a label, an air bubble, a pop-up window, a pulldown menu and a speech sound.

Figure 11:
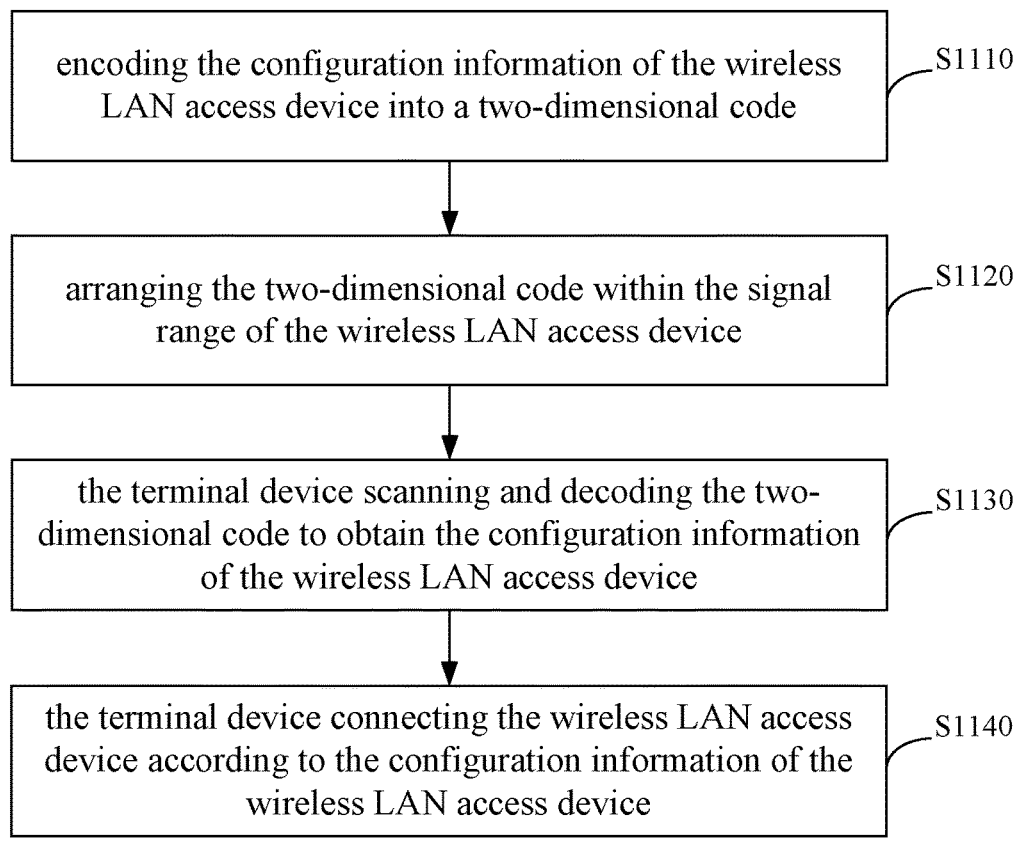
FIG. 11 is a flow chart of a wireless LAN access method of another embodiment according to the present invention.

Corresponding to the wireless LAN access system of the preceding embodiment of the present invention, FIG. 11 shows a flow chart of a wireless LAN access method according to an embodiment of the present invention. As shown in the figure, the access method comprises:

Step S1110: encoding the configuration information of a wireless LAN access device into a two-dimensional code;

Step S1120: arranging the two-dimensional code within the signal range of the wireless LAN access device;

Step S1130: a terminal device scanning and decoding the two-dimensional code to obtain the configuration information of the wireless LAN access device;

Step S1140: the terminal device connecting the wireless LAN access device according to the configuration information of the wireless LAN access device.

Optionally, the terminal device scanning and decoding the two-dimensional code to obtain the configuration information of the wireless LAN access device comprises: the terminal device scanning and decoding the two-dimensional code to obtain an encrypted character string; the terminal device decrypting the encrypted character string to obtain a clear text of the configuration information of the wireless LAN access device.

Optionally, the configuration information of the wireless LAN access device at least includes a title of the wireless LAN.

Optionally, the configuration information of the wireless LAN access device further includes at least one of: password or password and encryption type, network type, and security type of the wireless LAN.

Optionally, the above method further comprises: the terminal device detects whether the configuration information of the wireless LAN access device contains a password item, and reminds the user that the wireless LAN access device has security risks if there is no password item.

Wherein, the configuration information of the wireless LAN access device corresponding to the two-dimensional code contains a characteristic character for identifying the configuration information of the wireless LAN access device.

In the above embodiment, by encoding the configuration information of the wireless LAN access device into a two-dimensional code, and arranging the two-dimensional code within the signal range of the wireless LAN access device, the user uses the terminal device to scan the two-dimensional code so as to obtain the configuration information of the wireless LAN access device, thereby connecting terminal device to the wireless LAN quickly, which improves the efficiency of connecting of the terminal device to the wireless LAN, and overcomes the problem of error prone and time-consuming in the prior art.

The algorithms and display provided here are not inherently related to any particular computer, virtual system or other devices. Various universal systems can also be used together with the demonstrations based on this. According to the above description, the structure required for constructing such systems is obvious. In addition, the present invention is not directed at any particular programming languages either. It should be understood that various programming languages can be used to carry out the contents of the present invention described here, moreover, the above description on the particular languages is also for disclosure of the optimal embodiment of the present invention.

In the specification provided here, large amount of concrete details are explained. However, it can be understood that the embodiments of the present invention can be practiced in the case of without these concrete details. In some examples, the well known methods, structures and technologies are not shown specifically, so as not to make the understanding to the present specification ambiguous.

Similarly, it should be understood that in order to simplify this disclosure and help understanding one or more of the respective aspects of the invention, in the above description of the exemplary embodiments of the present invention, the features of the present invention are sometimes grouped together into a single embodiment, figure, or description on it. However, the disclosed method should not be explained as reflecting the following intention: i.e., the claimed invention claims more features than the features explicitly stated in each claim. More accurately, as reflected by the Claims below, the invention aspect lies in being less than all the features of the preceding disclosed single embodiment. Therefore, the Claims following an embodiment is incorporated into the embodiment explicitly, wherein each claim per se serves as a separate embodiment of the present invention.

Those skilled person in the art can understand that the modules in the device of an embodiment can be changed adaptively and arrange them in one or more devices different from the embodiment. The modules or units or components in the embodiment can be combined into a module or a unit or a component, in addition, they can be divided into a plurality of sub-modules or sub-units or sub-components. Except that at least some of such features and/or processes or units are mutually exclusive, any combinations can be used to combine all the features disclosed by this specification (including the accompanied claims, abstract and drawings) and all the processes or units of such disclosed any method or device. Unless it is stated explicitly, each feature disclosed in this specification (including the accompanied claims, abstract and drawings) can be replaced by the alternative feature that provides the same, equivalent or similar purposes.

In addition, the skilled person in the art can understand that some embodiments described here include some features rather than other features included in other embodiments, the combination of the features of different embodiments means that it is within the scope of the present invention and forms a different embodiment. For example, in the following Claims, any one of the claimed embodiments can be used in any combinations.

The respective component embodiments of the present invention can be carried out in hardware, or in a software module running on one or more processors, or in their combinations. The skilled person in the art should understand that a microprocessor or a digital signal processor (DSP) can be used in practice to carry out some or all functions of some or all components in the devices according to the embodiments of the present invention. The present invention can also be carried out for executing a part or all devices or device programs (e.g., computer programs and computer program products) of the method described here. Such programs for carrying out the present invention can be stored on a computer readable medium, or may have one or more signal forms. Such a signal can be downloaded from an internet website, or provided on a carrier signal, or provided in any other forms.

Figure 12:
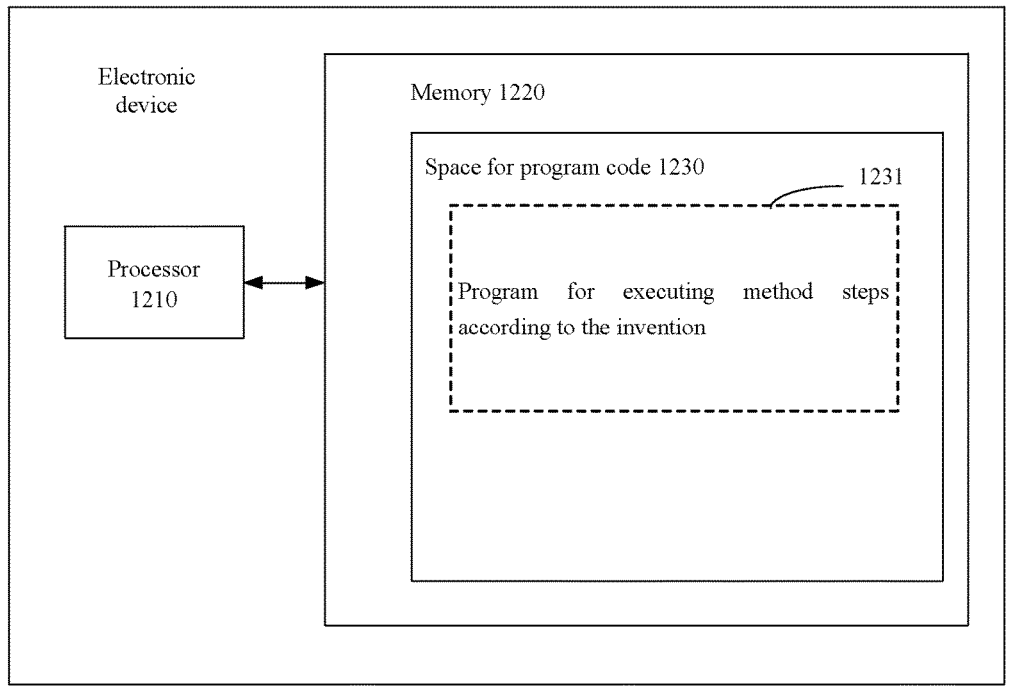
FIG. 12 shows a block diagram of an electronic device for carrying out a method of the present invention.
Figure 13:
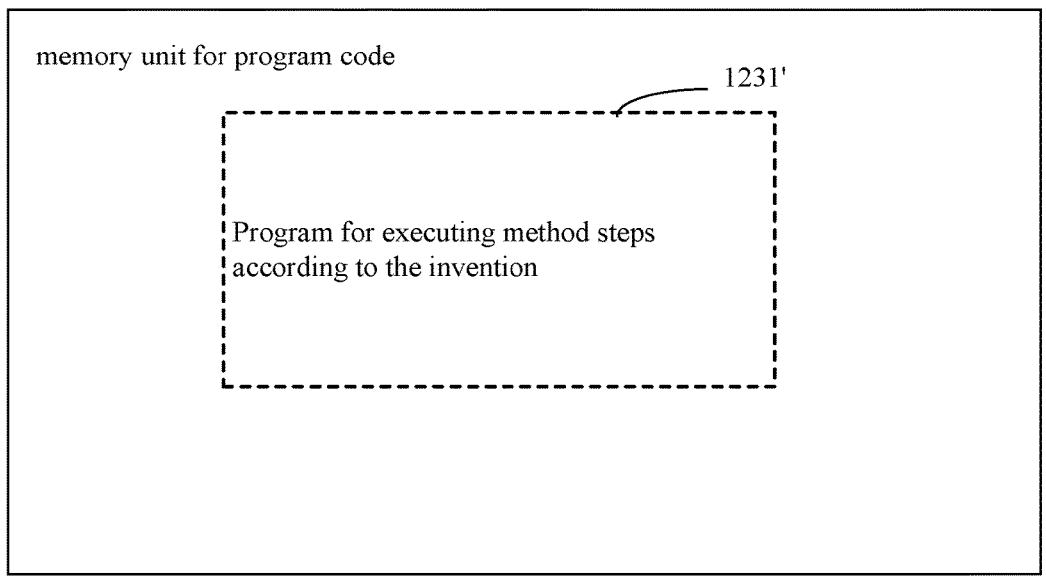
FIG. 13 shows a schematic view of a memory unit for keeping or carrying a program code for carrying out a method of the present invention.

For example, FIG. 12 shows an electronic device that can carry out the method of securely accessing a network address of the present invention. The electronic device traditionally comprises a processor 1210 and a computer program product or a computer readable medium in the form of a memory 1220. The memory 1220 may be an electronic memory such as a flash memory, an EEPROM (electrically erasable programmable read-only memory), an EPROM, a hard disk or a ROM. The memory 1220 has a memory space 1230 for a program code 1231 that executes any method steps in the above method. For example, the memory space 1230 for the program code may include respective program codes 1231 for carrying out various steps in the above method. These program codes can be read from one or more computer program products or written into the one or more computer program products. These computer program products include program code carriers such as hard disks, compact disks (CD), memory cards or floppy disks. Such a computer program product is generally a portable or fixed memory unit as shown in FIG. 13. The memory unit may have a memory segment or a memory space similarly arranged as the memory 1220 in the electronic device of FIG. 12. The program code may for example be compressed in an appropriate form. Generally, the memory unit comprises a program 1231' for executing the method steps according to the present invention, i.e., a code that can be read by a processor e.g., 1210, when these codes are run by the electronic device, the electronic device performs the respective steps in the method described above.

It should be noted that the above embodiments are explanations rather than limitations to the present invention, moreover, the skilled person in the art can design alternative embodiments in the case of not departing from the scope of the attached claims. In the claims, any reference signs located between the parentheses should not be construed as limitations to the claims. The word "comprise" does not exclude existence of elements or steps not listed in the claims. The word "a" or "one" before the element does not exclude existence of a plurality of such elements. The present invention can be carried out by means of hardware comprising a plurality of different elements and by means of an appropriately programmed computer. In a unit claim in which a plurality of means are listed, some of these means can be embodied through the same hardware item. The use of the words such as first, second and third and so on does not represent any sequence. These words can be construed as titles.

The invention claimed is:

1. A wireless local area network (LAN) access system comprising a checking device, a terminal device, and at least one wireless LAN access device, wherein:
   the wireless LAN access device comprising at least one processor and
   at least one memory including computer code, the at least one memory and the computer code configured to with the at least one processor cause the wireless LAN access device to at least:
   transmit its configuration information to the checking device;
   the checking device comprising at least one processor and
   at least one memory including computer code, the at least one memory and the computer code configured to with the at least one processor cause the checking device to at least:
   store the received configuration information of the wireless LAN access device, and check the received configuration information of the wireless LAN transmitted from the terminal device,
   determine whether the configuration information of the wireless LAN is consistent with the stored configuration information of the wireless LAN access device, and
   transmit the check result to the corresponding terminal device; and
   the terminal device comprising at least one processor and
   at least one memory including computer code, the at least one memory and the computer code configured to with the at least one processor cause the terminal device to at least:
   scan and decode a two-dimensional code to obtain the configuration information of the wireless LAN corresponding to the two-dimensional code,
   transmit the configuration information of the wireless LAN to the checking device,
   receive the checking result transmitted from the checking device, and
   forbid connection of the wireless LAN if the check result is that the check fails; and wherein the at least one memory and the computer code of the checking device are further configured to with the at least one processor of the checking device cause the checking device to at least:

receive the configuration information and position information of the wireless LAN which has been used by the terminal device;

store the configuration information and position information of the wireless LAN which has been used by the terminal device;

obtain position information of the terminal device which is connected to the Internet with the mobile telephone communication network;

query whether the configuration information of the wireless LAN corresponding to the obtained position information is stored; and in an instance when the configuration information of the wireless LAN corresponding to the obtained position information is stored, transmit the configuration information of the wireless LAN to the corresponding terminal device and remind the user that there is a wireless LAN available and whether to connect the wireless LAN.

2. The system as claimed in claim 1, wherein the decoding the two-dimensional code to obtain the configuration information of the wireless LAN corresponding to the two-dimensional code further comprises:

decoding the two-dimensional code to obtain an encrypted character string;

decrypting the encrypted character string to obtain the configuration information of the wireless LAN corresponding to the two-dimensional code.

3. The system as claimed in claim 1, wherein the at least one memory and the computer code of the checking device are further configured to with the at least one processor of the checking device cause the checking device to at least:

receive the configuration information transmitted from the wireless LAN access device, and receive the configuration information of the wireless LAN which is obtained and transmitted from the terminal device;

store the configuration information of the wireless LAN access device which is authenticated successfully; and check whether the configuration information of the wireless LAN received by the transmission interface is consistent with the configuration information of the stored wireless LAN access device, and transmit the check result to the terminal device.

4. The system as claimed in claim 3, wherein the at least one memory and the computer code of the checking device are further configured to with the at least one processor of the checking device cause the checking device to at least:

encode the configuration information of the stored wireless LAN access device into a two-dimensional code.

5. The system as claimed in claim 3, wherein the at least one memory and the computer code of the wireless LAN access device are further configured to with the at least one processor of the wireless LAN access device cause the wireless LAN access device to at least:

transmit the identity authentication information of the wireless network provider to the checking device; and wherein the at least one memory and the computer code of the checking device are further configured to with the at least one processor of the checking device cause the checking device to at least:

authenticate the identity authentication information of the wireless network provider of the wireless LAN access device; and store the configuration information of the wireless LAN access device whose wireless network provider identity authentication information has become authenticated successfully.

\* \* \* \* \*